United States Patent Office 2,721,206
Patented Oct. 18, 1955

2,721,206

2,2 - DICYANO - 1 - 1 - [(TRISUBSTITUTED AMMONIUM)ALKOXY]ETHENOLATES AND THEIR PREPARATION

William Joseph Middleton, Wilmington, Del., assignor to E. I. du Pont de Nemours and Company, Wilmington, Del., a corporation of Delaware No Drawing. Application July 1, 1954,
Serial No. 440,865

8 Claims. (Cl. 260—465.4)

This invention relates to organic compounds and their preparation and, more particularly, to a new class of ethenolates and a process of preparing same.

An object of the present invention is to provide a new class of ethenolates. A further object is to provide a process of preparing such compounds. Other objects will be apparent from the description of the invention given hereinafter.

The above objects are accomplished according to the present invention by reacting 2-dicyanomethylene cyclic 1,3-acetals with at least substantially molecular equivalent amounts of tertiary amines to form 2,2-dicyano-1-[(trisubstitutedammonium)alkoxy]ethenolates. These ethenolates constitute a new class of compounds.

Copending application Ser. No. 416,720 filed March 16, 1954, in the names of R. E. Heckert and W. J. Middleton, assigned to the assignee of the present application, discloses the preparation of 2-dicyanomethylene cyclic 1,3-acetals. More particularly, these acetals are substituted or unsubstituted 2-dicyanomethylene-1,3-dioxolanes and -dioxanes. They can be prepared by dissolving tetracyanoethylene in an excess of a dihydric alcohol, adding a catalyst, and heating the solution to boiling until the dark color characteristic of the solution of tetracyanoethylene in the alcohol is dispelled. The mixture is then cooled and the 2-dicyanomethylene-1,3-acetals crystallize out. The catalyst is used in amounts not exceeding 50 mol per cent, based on the tetracyanoethylene, and the catalyst can be practically any salt of a metal, e. g., ferric chloride or zinc acetate, or urea, or a tertiary amine such as triethylamine or pyridine.

Tetracyanoethylene, used in the preparation of the 2-dicyanomethylene cyclic 1,3-acetals, can be prepared by the reaction of sulfur monochloride with malononitrile.

It has now been discovered that when these 2-dicyanomethylene cyclic 1,3-acetals are reacted with at least substantially molecular equivalent amounts of a tertiary amine, i. e., at least substantially 1 mol of amine to 1 mol of 2-dicyanomethylene cyclic 1,3-acetal, the formation of a 2,2-dicyano-1-[(trisubstitutedammonium)alkoxy]ethenolate results and this may be readily isolated.

These ethenolates are meso-ionic compounds (Baker et al., J. Chem. Soc. 1949, 310) in that they are not well represented by an ordinary covalent structural formula but are more accurately portrayed as resonance hybrids of more than one ionic formula, as follows:

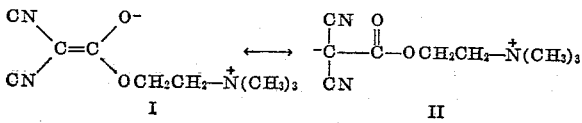

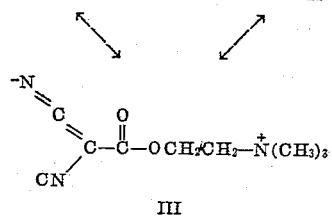

For example, the infrared absorption spectrum of 2,2-dicyano-1-[2-(trimethylammonium)ethoxy]ethenolate (I) gives strong evidence of a carbon-to-carbon double bond though somewhat modified, as if by the presence of a carbonyl bond. This indicates that, while (I) is the predominant form, the negative charge is probably stabilized by other resonance forms which possess a carbonyl structure (II and III).

It will be noted from (I) that the compounds of the present invention are also related to the betaines in that they possess a positively charged amino function and a negatively charged oxygen atom.

The 2,2-dicyano-1-[(trisubstitutedammonium)alkoxy]-ethenolates are stable, white crystalline solids characterized by relatively high melting points. They are very soluble in hot water, but are only slightly soluble in cold water and organic solvents.

The process of the present invention involves the reaction of a 2-dicyanomethylene cyclic 1,3-acetal with at least a substantially equimolecular quantity of a tertiary amine. The cyclic acetal can be used as such or can be prepared in situ by starting with a mixture of tetracyanoethylene, a glycol, and a tertiary amine as in Example X. The cyclic acetal which forms from tetracyanoethylene and the glycol under these conditions reacts with the tertiary amine to yield the ethenolate without the necessity of isolating the cyclic acetal.

The necessity of using at least a substantially molecular equivalent amount of a tertiary amine in the preparation of the ethenolates of this invention is primarily based on practical considerations. That is, when using a preformed cyclic acetal, the presence of less than a molecular equivalent amount of the tertiary amine, does not mean that no 2,2-dicyano-1-[(trisubstitutedammonium)alkoxy]ethenolate is formed but rather that all of the acetal is not used up which, in addition to being inefficient in itself, greatly complicates the isolation of uncontaminated 2,2-dicyano-1-[(trisubstitutedammonium)alkoxy]-ethenolate, an otherwise quite simple operation. Further, when the cyclic acetal is prepared in situ by starting with tetracyanoethylene and an excess of glycol (to insure full use of the tetracyanoethylene) and a substantial amount of tertiary amine is present but appreciably less than 1 mol per mol of tetracyanoethylene, some 2,2-dicyano-1-[(trisubstitutedammonium)alkoxy]ethenolate will be formed, at least on prolonged heating, but here again isolation is difficult and there will be far from complete conversion of the cyclic acetal.

In a preferred embodiment of this invention, an equimolecular mixture of dicyanoketene ethylene acetal (alternately named 2-dicyanomethylene-1,3-dioxolane) and trimethylamine is dissolved in acetone or tetrahydrofuran and allowed to stand at room temperature for 12 to 18 hours. 2,2 - dicyano-1-[2-(trimethylammonium)ethoxy] ethenolate separates as a white crystalline solid which is collected by filtration. It may be purified by washing with diethyl ether and recrystallized from water.

The following examples wherein all proportions are by weight unless otherwise stated, illustrate specific embodiments of the invention. All percentage yields given are based on the amount of the cyclic acetal employed.

EXAMPLE I

A solution of 136 parts of dicyanoketene ethylene acetal in 444 parts of tetrahydrofuran is saturated with trimethylamine and the white precipitate which forms is collected on a filter, washed with ether and recrystallized from water. There is obtained 125 parts (63%) of 2,2-dicyano-1-[2-(trimethylammonium)ethoxy]ethenolate in the form of white prisms, M. P. 210–212° C.

*Anal.*—Calcd. for $C_9H_{13}N_3O_2$: C, 55.37; H, 6.71; N, 21.53. Found: C, 55.59, 55.68; H, 6.86, 6.84; N, 21.62, 21.64.

EXAMPLE II

A solution of 101 parts of triethylamine and 136 parts of dicyanoketene ethylene acetal in 444 parts of tetrahydrofuran is allowed to stand at room temperature for 10 minutes. The white precipitate which forms is collected on a filter, washed with ether and recrystallized from water. There is obtained 230 parts (97%) of 2,2-dicyano-1-[2-(triethylammonium)ethoxy]ethenolate in the form of a white crystalline solid, M. P. 184–186° C.

*Anal.*—Calcd. for $C_{12}H_{19}N_3O_2$: C, 60.74; H, 8.07; N, 17.71. Found: C, 60.85, 61.07; H, 8.14, 8.03; N, 17.25, 17.58.

EXAMPLE III

A solution of 1360 parts of dicyanoketene ethylene acetal in 8880 parts of tetrahydrofuran is mixed with 2134 parts of distilled dimethyldodecylamine. The solution is allowed to stand for 24 hours and a seed crystal is prepared by evaporating a small portion of the solution and vigorously scratching the viscous residue between glass surfaces. The main reaction mixture is diluted with ether and the seed crystal is added. The white precipitate which forms is recrystallized from alcohol-ether. There is obtained 2500 parts (72%) of 2,2-dicyano-1-[2-(dimethyldodecylammonium)ethoxy]ethenolate in the form of white needles, M. P. 70° C.

*Anal.*—Calcd. for $C_{20}H_{35}N_3O_2$: C, 68.73; H, 10.09; N, 12.02. Found: C, 68.95, 68.87; H, 10.11, 10.45; N, 12.12, 12.13.

EXAMPLE IV

A solution of 165 parts of quinoline and 136 parts of dicyanoketene ethylene acetal in 440 parts of tetrahydrofuran is allowed to stand overnight at room temperature. The yellow precipitate which forms is collected on a filter, washed with ether and recrystallized from about 100,000 parts of water. There is obtained 200 parts (76%) of 2,2-dicyano-1-[2-(1-quinolinium)ethoxy]ethenolate in the form of yellow crystals, M. P. 239–242° C.

*Anal.*—Calcd. for $C_{15}H_{11}N_3O_2$: C, 67.91; H, 4.18; N, 15.84. Found: C, 67.88, 67.90; H, 4.36, 4.43; N, 15.91, 15.87.

This ethenolate departs from the general rule in being yellow in color rather than white in crystalline form.

EXAMPLE V

A solution of 197 parts of pyridine and 272 parts of dicyanoketene ethylene acetal in 888 parts of tetrahydrofuran is allowed to stand at room temperature for 10 minutes. The solution becomes warm and a white precipitate forms. The precipitate is collected on a filter, washed with ether and recrystallized from water. There is obtained 360 parts (84%) of 2,2-dicyano-1-[2-(1-pyridinium)ethoxy]ethenolate in the form of white needles, M. P. 201–202° C.

*Anal.*—Calcd. for $C_{11}H_9N_3O_2$: C, 61.39; H, 4.22; N, 19.53. Found: C, 61.45, 61.71; H, 4.28, 4.27; N, 19.57, 19.68.

The structure of 2,2-dicyano-1-[2-(1-pyridinium)ethoxy]ethenolate is elucidated by the following test.

Part A 1-(2-hydroxyethyl)pyridinium Reineckate is prepared as follows.

A solution of 3.54 g. (0.01 mole) of Reinecke salt $(NH_4[Cr(CNS)_4(NH_3)_2])$ in 50 ml. of water is mixed with a solution of 1.6 g. (0.01 mole) of 1-(2-hydroxyethyl)-pyridinium chloride (Barnes and Adams, J. Am. Chem. Soc. 49, 1311–12 (1927)) in 10 ml. of water. The pink precipitate which forms is collected on a filter, washed with water and recrystallized from acetone-water. There is obtained 5 g. of 1-(2-hydroxyethyl)pyridinium Reineckate in the form of lavender flakes, M. P. 186–192° C. with decomposition.

*Anal.*—Calcd. for $C_{11}H_{16}N_7S_4OCr$: C, 29.85; H, 3.66; N, 22.15. Found: C, 30.14; H, 3.82; N, 22.20, 22.24.

Part B 2,2-dicyano-1-[2-(1-pyridinium)ethoxy]ethenolate, 2.15 g. (0.01 mole), is dissolved in 20 ml. of 5N hydrochloric acid and the solution is heated under reflux for 30 minutes. This solution is cooled and mixed with a filtered solution of 3.54 g. (0.01 mole) of Reinecke salt in 50 ml. of water. The pink precipitate which forms is collected on a filter, washed with water and recrystallized from acetone-water. There is obtained 4 g. of 1-(2-hydroxyethyl) pyridinium Reineckate in the form of lavender flakes, M. P. 186–189° C. The X-ray diffraction pattern and infrared absorption spectrum of this product are identical with those of the 1-(2-hydroxyethyl)pyridinium Reineckate prepared from 1-(2-hydroxyethyl)-pyridinium chloride as described in Part A.

EXAMPLE VI

A solution of 95 parts of alpha-picoline and 136 parts of dicyanoketene ethylene acetal in 888 parts of tetrahydrofuran is allowed to stand overnight at room temperature. The white crystalline precipitate which forms is collected on a filter, washed with ether and recrystallized from water. There is obtained 150 parts (66%) of 2,2-dicyano-1-[1-(alpha-picolinium)ethoxy]ethenolate in the form of white plates, M. P. 175° C.

*Anal.*—Calcd. for $C_{12}H_{11}N_3O_2$: C, 62.87; H, 4.95; N, 18.33. Found: C, 62.93, 63.15; H, 5.10, 4.94; N, 18.42, 18.52.

EXAMPLE VII

Alpha-bromopyridine, 249 parts, is added to a solution of 136 parts of dicyanoketene ethylene acetal in 444 parts of tetrahydrofuran. The solid which separates after standing for one week is collected on a filter, washed with ether and recrystallized from water. There is obtained 220 parts (77%) of 2,2-dicyano-1-[2-(1-alpha-bromopyridinium)ethoxy]ethenolate in the form of white prisms, M. P. 168–170° C.

*Anal.*—Calcd. for $C_{11}H_8N_3BrO_2$: C, 44.92; H, 2.74; N, 14.29. Found: C, 44.83; H, 3.01; N, 14.37, 14.34.

EXAMPLE VIII

A solution of 192 parts of N,N-dimethylaniline and 136 parts of dicyanoketene ethylene acetal in 444 parts of tetrahydrofuran is allowed to stand overnight at room temperature. The white precipitate which forms is collected on a filter, washed with ether and recrystallized from methyl alcohol. There is obtained 200 parts (78%) of 2,2-dicyano-1-[2-(dimethylphenylammonium)ethoxy]-ethenolate in the form of white prisms, M. P. 160–161.5° C.

*Anal.*—Calcd. for $C_{14}H_{15}N_3O_2$: C, 65.35; H, 5.88; N, 16.33. Found: C, 64.80, 64.82; H, 5.96, 5.92; N, 16.41, 16.39.

EXAMPLE IX

A solution of 100 parts of pyridine and 100 parts of dicyanoketene trimethylene acetal (alternately named 2-dicyanomethylene-1,3-dioxane) in 265 parts of tetrahydrofuran is allowed to stand overnight at room temperature. The solid which forms is collected on a filter, washed with ether and recrystallized from water. There is obtained 140 parts (91%) of 2,2-dicyano-1-[3-(1-pyridinium)propoxy]ethenolate in the form of white plates, M. P. 173–174° C.

*Anal.*—Calcd. for $C_{12}H_{11}N_3O_2$: C, 62.87; H, 4.84; N, 18.33. Found: C, 62.90, 63.03; H, 4.92, 5.10; N, 18.49, 18.52.

EXAMPLE X

A mixture of 100 parts of tetracyanoethylene, 246 parts of pyridine, and 279 parts of distilled ethylene glycol is heated on a steam bath until solution is complete. The black mixture is allowed to stand several hours at room tempertaure and a dark precipitate forms. This solid material is collected on a filter, washed with water and then recrystallized from water to give 50 parts (30%) of 2,2-dicyano-1-[2-(1-pyridinium)ethoxy]ethenolate, M. P. 201–202° C. A mixed melting point with the product of Example V is not depressed.

It will be understood that the above examples are merely illustrative and that the present invention broadly comprises the new class of compounds, 2,2-dicyano-1-[(trisubstituted-ammonium)alkoxy]ethenolates and the process of preparing such ethenolates by reacting a 2-dicyanomethylene cyclic 1,3-acetal with at least a substantially molecular equivalent amount of a tertiary amine.

The 2-dicyanomethylene 1,3-acetals used in the preparation of the ethenolates of this invention are alternately termed 2-dicyanomethylene 1,3-dioxacycloalkanes. They comprise 2-dicyanomethylene-1,3-dioxolane having the formula:

$$\begin{array}{c} NC \\ \diagdown \\ \phantom{N}C=C \\ \diagup \\ NC \end{array} \begin{array}{c} O-CH_2 \\ \phantom{O-C}| \\ O-CH_2 \end{array}$$

and 2-dicyanomethylene-1,3-dioxane having the formula:

$$\begin{array}{c} NC \\ \diagdown \\ \phantom{N}C=C \\ \diagup \\ NC \end{array} \begin{array}{c} O-CH_2 \\ \phantom{O-C}\diagdown CH_2 \\ O-CH_2 \diagup \end{array}$$

and their hydrocarbon-substituted derivatives in which any of the hydrogens at the 4- and 5- positions of the dioxolane or the 4-, 5-, and 6- positions of the dioxane are replaced by hydrocarbon radicals, including compounds in which any two of these hydrogens are replaced by the points of attachment of a hydrocarbon diradical. Illustrative of such hydrocarbon-substituted derivatives are: 2 - dicyanomethylene - 4 - methyl - 1,3 - dioxolane; 2-dicyanomethylene - 4,4,5,5 - tetraethyl - 1,3 - dioxolane; 2-dicyanomethylene - 4,5 - di - n - propyl - 1,3 - dioxolane; and 2 - dicyanomethylene-4,4,6-trimethyl - 1,3 - dioxane.

Other of these hydrocarbon-substituted derivatives are shown in Table I below.

The ethenolates of this invention are prepared by reacting these 2-dicyanomethylene 1,3-acetals with tertiary amines. The tertiary amines include both compounds in which the trivalent nitrogen is bonded to three separate carbon atoms and those in which the trivalent nitrogen is singly bonded to one carbon atom and doubly bonded to another carbon atom as in pyridine, quinoline, N-benzylideneaniline, N-1-ethylbutylidiene-p-toluidine, and the like. It is essential in order to separate the ethenolates with facility that the tertiary amine be present in at least substantially molecular equivalent amounts and it can be present in considerable excess.

The process of this invention can be carried out under very mild conditions since the reaction takes place readily at room temperature and at atmospheric pressure. It is ordinarily convenient to provide for dissipation of the heat of reaction by carrying out the process in the presence of a liquid diluent. Such a diluent is preferably a solvent for the reactants and/or the products and can be water, an aliphatic alcohol, a ketone or a cyclic ether. However, a liquid diluent is not essential to the process of the invention. When the tertiary amine to be employed is a liquid, for example, pyridine, it suffices to dissolve the 2-dicyanomethylene 1,3-acetal in the amine and allow the reaction to proceed without the presence of other additives.

The 2,2-dicyano-1-[(trisubstitutedammonium)alkoxy] ethenolates of this invention can be represented by the following formula:

$$\begin{array}{c} NC \\ \diagdown \\ \phantom{N}C=C \\ \diagup \\ NC \end{array} \begin{array}{c} O^- \\ \diagup \\ O-(CR_2)_n\overset{+}{N}A_3 \end{array}$$

where $n$ is 2 or 3, the R's may be hydrogen, hydrocarbon radicals or any two of them may represent points of attachment for a hydrocarbon diradical, and the A's represent attachment of three bonds of nitrogen to two or three separate carbon atoms in aliphatic, aralkyl or aromatic radicals (including diradicals which form a ring with the nitrogen as a heteroatom).

When equivalent amounts of the starting materials indicated in Table I are employed in the process of Example IV, the indicated 2,2-dicyano-1-[(trisubstitutedammonium)alkoxy]ethenolates are obtained.

*Table I*

| Starting Materials | | Product |
|---|---|---|
| 2-Dicyanomethylene 1,3-Acetal | Tertiary Amine | 2,2-Dicyano-1-[(trisubstitutedammonium)alkoxy] ethenolate |
| 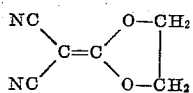<br>dicyanoketene trimethylene acetal<br>[2-dicyanomethylene-1,3-dioxane] | N-ethylpiperidine | 2,2-dicyano-1-[3-(N-ethylpiperidinium)-propoxy]ethenolate |
| 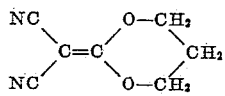<br>dicyanoketene 1,2-diethyl-1,2-diisopropylethylene acetal<br>[2-dicyanoethylene-4,5-diethyl-4,5-diisopropyl-1,3-dioxolane] | N-benzylideneaniline | 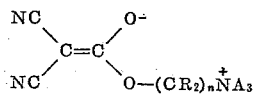<br>2,2-dicyano-1-[2-(N-benzylideneanilinium)-1-ethyl-1,2-diisopropylbutoxy] ethenolate |

Table I—Continued

| Starting Materials | | Product |
|---|---|---|
| Dicyanoketene Cyclic Acetal | Tertiary Nitrogen Compound | 2,2-Dicyano-1-[(trisubstitutedammonium)alkoxy] ethenolate |
| 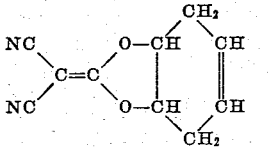<br>dicyanoketene 1,2-(4-cyclohexene)ylene acetal<br>[3,4-(dicyanomethylene)-methylenedioxy-1-cyclohexene] | 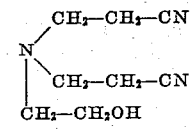<br>di-(beta-cyanoethyl)-ethanolamine | 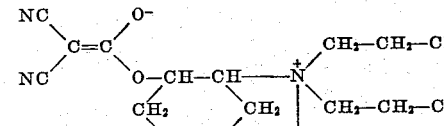<br>2,2-dicyano-1-[6-(di-[beta-cyanoethyl]-beta-hydroxyethylammonium)-3-cyclohexeneoxy] ethenolate |

The 2,2-dicyano-1-[(trisubstitutedammonium)alkoxy] ethenolates of the present invention are useful as antistatic agents for hydrophobic textiles. For exampel, a tricot-knit fabric of "Dacron" polyester fiber is dipped in a hot 1% aqueous solution of 2,2-dicyano-1-[2-(triethylammonium)ethoxy] ethenolate. Excess solution is removed by centrifuging and the fabric is dried. Friction of this treated fabric against wool, hair or plastic materials produces substantially no accumulation of static charge, whereas a control piece of the same fabric in untreated form when subjected to similar friction becomes charged with static electricity so that it fails to drape properly and tends to attract particles of dirt and dust to the fabric.

As many apparently widely different embodiments of this invention may be made without departing from the spirit and scope thereof, it is to be understood that the invention is not limited to the specific embodiments thereof except as defined in the appended claims.

The invention claimed is:

1. A 2,2-dicyano-1-[(trisubstitutedammonium)alkoxy] ethenolate.

2. A 2,2-dicyano-1-[2-(trisubstitutedammonium)ethoxy] ethenolate.

3. A 2,2-dicyano-1-[3-(trisubstitutedammonium)propoxy] ethenolate.

4. A 2,2-dicyano-1-[(trialkylsubstitutedammonium)alkoxy] ethenolate.

5. A 2,2-dicyano-1-[2-(trialkylsubstitutedammonium)ethoxy] ethenolate.

6. 2,2 - Dicyano - 1 - [2 - (trimethylammonium)ethoxy] ethenolate.

7. Process of preparing a 2,2-dicyano-1-[(trisubstitutedammonium)alkoxy] ethenolate which comprises reacting a 2-dicyanomethylene cyclic 1,3-acetal with at least a substantially molecular equivalent amount of a tertiary amine.

8. Process as set forth in claim 7 wherein said reaction is carried out in an inert liquid diluent under substantially atmospheric conditions.

No references cited.